March 22, 1960 E. R. WILSON 2,930,003

TRANSISTORIZED HARMONIC GENERATOR

Filed Nov. 24, 1958

INVENTOR.
EDWARD R. WILSON.
BY Alden D. Redfield
Irwin P. Garfinkle
ATTORNEYS.

United States Patent Office 2,930,003

Patented Mar. 22, 1960

2,930,003

TRANSISTORIZED HARMONIC GENERATOR

Edward R. Wilson, Cincinnati, Ohio, assignor to Avco Manufacturing Corporation, Cincinnati, Ohio, a corporation of Delaware Application November 24, 1958, Serial No. 775,971

5 Claims. (Cl. 331—117)

This invention relates to a harmonic generator and, more particularly, to a transistorized harmonic generator having an essentially constant output voltage across a wide harmonic spectrum.

Many systems for generating a wide harmonic spectrum are known in the art. Such spectrums have been produced in vacuum tube circuits by means of class C amplifiers biased to produce sharp current pulses at the plate of the tube. These pulses are rich in harmonics, and a tuned circuit is employed to extract the desired harmonic. Another system for generating harmonics involves the use of a square wave generator, such as a multivibrator, the output of which is differentiated, thus producing pulses with a fast rise time having a rich harmonic content. However, none of the prior art systems are capable of producing a controlled output having a substantially constant level of harmonics in a simple, economical and compact manner.

In transistor circuits the generation of harmonics may be obtained by the use of similar methods. For example, the transistor multivibrator produces a square wave from which harmonics may be derived, but this circuit requires two transistors plus another oscillator circuit for providing synchronization, and generally cannot be considered practical in equipment where space and reliability are of prime importance. The double-based diode avoids the space problem of the multivibrator circuit; however, the frequency limitations of this device restricts its use to circuits operating at frequencies well under one megacycle.

It is, therefore, the primary object of this invention to provide a miniaturized harmonic generator capable of producing an essentially constant output voltage across a wide harmonic spectrum.

Another object of this invention is to provide a miniaturized harmonic generator capable of producing a fundamental frequency of one megacycle or more, and of producing a wide spectrum of harmonics having a voltage substantially equal to that of the fundamental.

Another object of this invention is to provide a crystal-controlled oscillator circuit having a high Q tank resonant at the fundamental frequency, and a load connected across the oscillator tank automatically controlling its Q and amplifying the harmonics to produce a substantially constant spectrum of harmonics.

For a more complete understanding of the further objects and the precise nature of this invention, reference should now be made to the following detailed description and to the accompanying drawing, in which.

Briefly described, this invention makes use of a highly stable transistor oscillator having a high Q tank circuit lightly loaded by the transistor. As will be seen, the oscillator is actually a self-activating gate; that is to say, in operation, a high initial bias is applied instantaneously to the base, causing heavy momentary surge currents in the collector circuit, thus exciting the tank circuit and setting it into oscillation at its natural resonant frequency. An automatic biasing arrangement is provided for gating down the power supply, thus quickly reducing the transistor currents. The cycle then repeats. Since the Q of the tank is high, and since the tank is loaded very lightly by the transistor, high frequency stability is achieved.

It is known that when the Q of the tank circuit is high, the generated frequency will approximate a pure sine wave, but as the Q is reduced, the higher orders of harmonics increase in amplitude. By this invention, means are provided for automatically adjusting the Q of the tank in accordance with the frequency characteristics of the load connected across it, and for automatically amplifying the higher order of harmonics. As will be seen, the load circuit includes means for establishing the necessary operating level for the oscillator.

Figure 1:
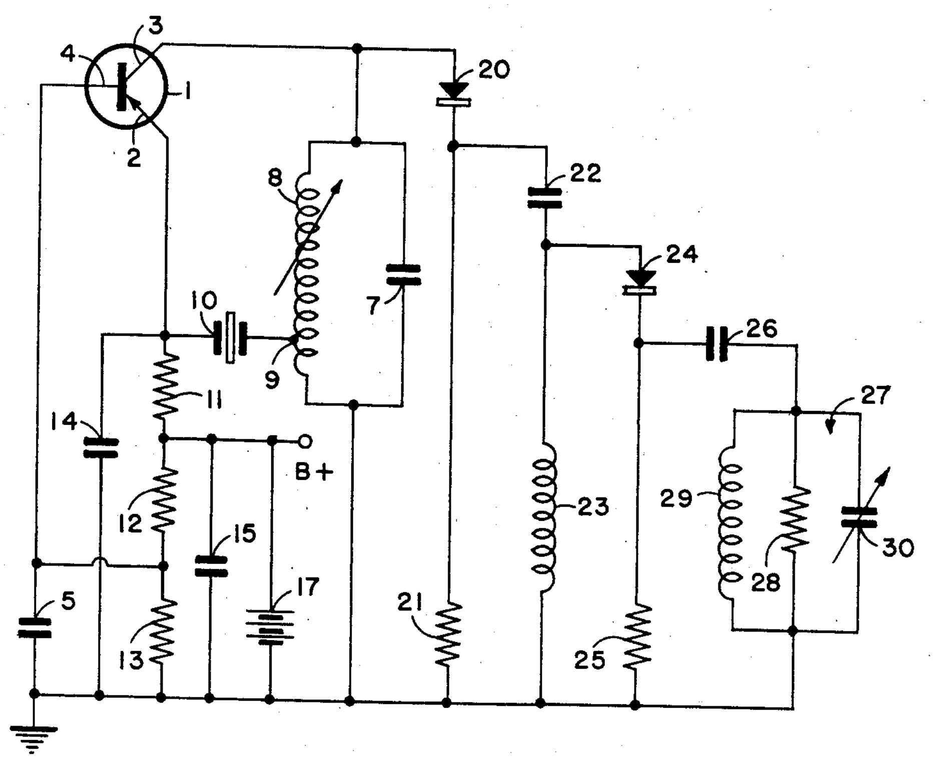
Fig. 1 is a schematic representation of a preferred form of the invention.

Referring now to Fig. 1, the oscillator circuit comprises a junction type PNP transistor 1 having an emitter 2, a collector 3 and a base 4 grounded for alternating currents by means of the condenser 5. As in conventional oscillators, the transistor load comprises a tank circuit 6 having a condenser 7 and a variable inductor 8 tuned to the desired fundamental frequency. A resonant feedback path from the tank circuit to the input circuit is provided from a tap 9 on the inductor 8 through a resonant piezoelectric crystal 10 to the emitter 2. The amount of feedback from the tap 9 is very small and has little effect on circuit operation when the tank is operating at a resonance but becomes highly degenerative when the frequency deviates from resonance.

The biasing circuit for the transistor 1 includes biasing resistors 11, 12 and 13 connected in series between the emitter 2 and ground. The biasing resistors 12 and 13 are shunted for alternating currents by means of a condenser 15, and the resistor 13 is shunted by the condenser 5. A condenser 14 provides the required feedback path from the emitter 2 to the base 4. A battery 17 or other source of B+ potential is connected across the resistors 12 and 13.

As indicated previously, the oscillator is a self-actuating gate; that is to say, the oscillator gates the power supply to the tank on and off as conditions of bias change. Thus, when the battery 17 is first connected in circuit across the resistors 12 and 13, a very large percentage of the voltage supply is instantaneously applied across the base-emitter electrodes through the resistor 11 and the condenser 5, and is also connected across the emitter and collector electrodes through the resistor 11 and tank condenser 7. This causes very heavy surge currents through the tank circuit and through the collector 3, the emitter 2 and the resistors 11, 12 and 13. However, as soon as the heavy current flow equalizes the bias on resistors 11 and 12, and as soon as the bias between resistors 12 and 13 is reduced, the transistor current is reduced to a very low value and the power to the tank from the battery is gated down. This condition continues until the completion of the cycle, when the battery is again gated to the tank.

The loading of the tank circuit 6 is accomplished by means of a plurality of branches connected in a unique arrangement. The first branch consists of a diode 20 in series with a resistor 21 and is connected across the oscillator tank circuit 6. The second branch constitutes an alternating current shunt for the resistor 21, and it consists of a condenser 22 and an inductor 23. For a reason to be explained in more detail below, the condenser 22 and the inductor 23 are tuned slightly above the resonant frequency of the tank circuit. For example, if the oscillator tank circuit is tuned at 1 megacycle, the condenser 22 and the inductor 23 might be tuned to 1.2 or 1.3 megacycles. The third branch is connected across the inductor 23, and it comprises a second diode 24 series-connected with a resistor 25, while the fourth branch is connected across the resistor 25 and includes a condenser 26 and an automatically selective load 27 represented by the parallel-connected resistor 28, inductor 29 and variable capacitor 30.

In operation, the diode 20 will block the flow of current on the negative half-cycle; however, the diode 20 conducts on the positive half-cycle, the resistor 21 providing a direct current path, and the condenser 22 and the inductor 23 constituting a relatively low impedance alternating current path, since it is tuned essentially at the fundamental frequency of the tank circuit.

On the positive half-cycle the condenser 22 is charged by the current flowing through it, while on the negative half-cycle the condenser 22 tends to discharge through the resistor 21. Because of the selection of the circuit components, the time constants are such that a running potential is built up across the resistor 21 shortly after oscillation starts, and this potential applies a back-bias voltage on the diode 20. Because of the back-bias on the diode 20, it will now conduct only during a portion of the positive half-cycle of the oscillator and, by adjusting the level of the bias, the load on the oscillator tank may be controlled.

At this point it will be recognized that by controlling the back-bias of diode 20, the loading of the oscillator tank and the Q are also controlled. Since the harmonic level of the generated signals varies with Q, the generated harmonics can be controlled by regulating the voltage across resistor 21. The back-bias voltage on resistor 21 is controlled and, in addition, the harmonics are amplified by means of the third and fourth branches which shunt the inductor 23.

In so far as the third and fourth branches are concerned, the inductor 23 may be considered as a voltage source. On the positive half-cycle, the current generated by the inductor 23 flows through the diode 24, the condenser 26 and the load 27. As before, the condenser 26 discharges through resistor 25 on the negative half-cycle and builds a back-bias on diode 24, and this back-bias will be dependent upon the load. Thus, when the automatically selective load 27 is tuned to extract a given frequency, a running bias is established which remains substantially fixed. However, if the selective load is changed so as to extract a lower harmonic, for example, it will be seen that the back-bias on diode 24 will be increased. An increase in back-bias on the diode 24 reduces conduction through that diode and, hence, reduces the loading of the second branch. This, in turn, reduces the loading of the diode 20 and the oscillator tank 6. With the loading of the oscillator tank 6 reduced, the Q of the tank circuit is increased, thereby reducing the level of the higher order harmonics generated by the tank and providing an adjusted level for the required reduced frequency. Similarly, extracting a higher harmonic from the load 27 will enrich the level of the higher order harmonics of the tank circuit 6, since the Q will be reduced.

Figure 2:
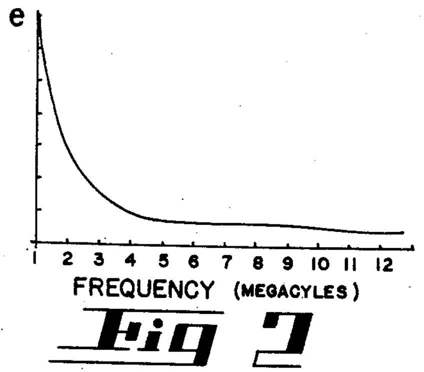
Fig. 2 is a curve representing the amplitude distribution of the harmonics ordinarily generated by the oscillator.

In addition to adjusting the harmonic level of the tank circuit, the disclosed arrangement also provides selective amplification for the generated harmonics. As is known, the higher order of harmonics generated by the tank circuit 3 are ordinarily of a much smaller amplitude than the lower order of harmonics and, as is illustrated in Fig. 2, the higher orders decrease in amplitude in an exponential manner. Compensation for this decrease is provided, in part, by the impedance of the inductor 23 in the second branch which varies with frequency and serves as a voltage stepup device for the higher order of harmonics. Additional compensation is achieved by the diode 24 which serves as a passive amplifier. That is, as the back-bias on resistor 25 is increased or decreased, due to the adjustment of the load 27 for selecting various frequencies, the conductivity of the diode will also be adjusted. It will be noted that conductivity of the diode increases at the higher harmonic frequencies and, hence, the amplification characteristics of the diode 24 have an equalizing tendency for the various frequencies. This tendency, combined with the variable impedance characteristics of the inductor 23, yields a harmonic spectrum in which the voltage amplitude of the harmonics over a wide range is substantially equal, such as is illustrated in Fig. 3.

As was indicated previously, the condenser 22 and the inductor 23 in the second branch of the load circuit are series-tuned to a frequency slightly higher than the fundamental. This particular tuning was chosen, and the specific values of resistance, capacitance and inductance in the first and second branches were selected so that operation of the circuit occurs at a point on the resonance curve of the tank circuit 6 where the slope corresponds substantially to the required amplitude compensations for the various harmonic frequencies. The results illustrated by the curve of Fig. 3 were achieved by using the following circuit parameters:

| | |
|---|---|
| Transistor 1 | Type 2N499. |
| Condenser 5 | .0047 $\mu$f. |
| Condenser 7 | 200 $\mu$f. |
| Inductor 8 | 120–130 $\mu$h. |
| Crystal 10 | Resonant at 1 megacycle. |
| Resistor 11 | 1.2K ohms. |
| Resistor 12 | 1.2K ohms. |
| Resistor 13 | 8.2K ohms. |
| Condenser 14 | 1500 $\mu\mu$f. |
| Diode 20 | Type HD–6558. |
| Resistor 21 | 27K ohms. |
| Condenser 22 | .001 $\mu$f. |
| Inductor 23 | 20 $\mu$h. |
| Diode 24 | Type HD–6558. |
| Condenser 26 | .001 $\mu$f. |

Figure 3:
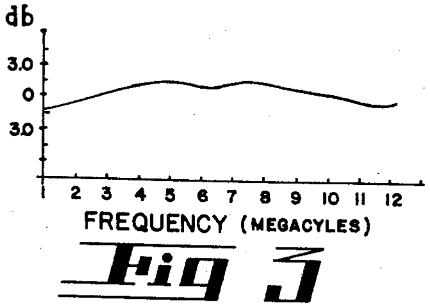
Fig. 3 is a curve representing the harmonic output of a generator made in accordance with this invention.

The response for a frequency spectrum of 12 harmonics is shown in Fig. 3, and it may be seen that over this range there is a variation of less than ±2 db. The voltage response of the generator operating into a 1000 ohm load over a range of 27 harmonics was as follows:

| Frequency, megacycles, | Output voltage, millivolts |
|---|---|
| 1 | 105 |
| 2 | 115 |
| 3 | 135 |
| 4 | 145 |
| 5 | 150 |
| 6 | 145 |
| 7 | 150 |
| 8 | 150 |
| 9 | 145 |
| 10 | 135 |
| 11 | 130 |
| 12 | 125 |
| 13 | 105 |
| 14 | 92 |
| 15 | 65 |
| 16 | 44 |
| 17 | 42 |
| 18 | 42 |
| 19 | 40 |
| 20 | 36 |
| 21 | 30 |
| 22 | 26 |
| 23 | 22 |
| 24 | 18 |
| 25 | 14 |
| 26 | 11 |
| 27 | 9.5 |

From the foregoing it is noted that the voltage level is substantially constant up to the 14th harmonic; moreover, this invention is also capable of producing relatively large voltage output up to and beyond the twenty-seventh harmonic with only ±7 db variation between the first and the twentieth harmonics. By adjusting the values of resistor 21, condenser 22 and inductor 23, the slope of the response curve may be altered so as to equalize the higher order harmonics at a lower amplitude level.

While the foregoing circuit parameters were used in an embodiment of this invention which was successfully reduced to practice, it is to be understood that these parameters are merely illustrative and are not intended to limit the scope of the invention. It is also clear that many modifications and adaptations will become readily apparent to persons skilled in the art; for this reason, it is intended that the invention be limited only by the following claims, as interpreted in the light of the prior art.

What is claimed is:

1. A harmonic generator comprising: an alternating current generator having a high Q resonant tank circuit tuned to a predetermined fundamental frequency; means for operatively energizing said generator for producing an alternating voltage output at said fundamental frequency across said tank circuit; a first unidirectional conduction device and a resistor series connected across said tank circuit; means for biasing said first unidirectional conduction device for conduction during only a portion of each half-cycle of one polarity of said tank circuit output and for stepping up the voltage output of the higher order harmonics of the fundamental frequency, said means including a condenser and an inductor connected across said resistor for impressing on said resistor a running voltage bias, said condenser and inductor being tuned to a frequency slightly higher than said predetermined fundamental frequency; and means for deriving an output voltage at a selected harmonic frequency from across said inductor.

2. The invention as defined in claim 1 wherein said means for deriving an output voltage at a selected harmonic frequency comprises a second unidirectional conduction device in series with a second resistor and connected across said inductor; and a frequency-selective load coupled across said second resistor, whereby the harmonic output level is automatically controlled.

3. A harmonic generator comprising: a stable oscillator having a high Q resonant tank circuit tuned to a predetermined fundamental frequency; first, second, third and fourth branches shunted across said tank circuit; said first branch comprising a first unidirectional conduction device in series with a first resistor, said first branch being connected across said tank circuit; said second branch comprising a first condenser in series with a first inductor, said second branch being connected across said first resistor and being tuned to a frequency slightly higher than said fundamental frequency; said third branch comprising a second unidirectional conduction device connected in series with a second resistor, said third branch being connected across said first inductor; and said fourth branch including a frequency-selective load connected across said second resistor.

4. A harmonic generator comprising: a transistor having base, emitter and collector electrodes; a high Q resonant tank circuit tuned to a predetermined fundamental frequency and connected between said collector and a point of reference potential; a biasing network for energizing said tank circuit, said biasing network comprising first, second and third series connected resistors connected between said emitter electrode and said source of reference potential; a source of direct current potential connected across said second and third series connected resistors, one terminal of said source of potential being connected to said point of reference potential; a condenser connecting said base electrode to said point of reference potential for alternating currents, said condenser being connected across said third resistor for providing an alternating current bypass for said third resistor; a resonant feedback connection from a portion of said tank circuit to said emitter electrode; a frequency-selective load; a shunt circuit coupling said frequency-selective load to said tank circuit; said shunt circuit automatically regulating the Q of said tank circuit and selectively amplifying predetermined harmonics in accordance with said load; said shunt circuit including a unidirectional conduction device in series with a resistor, said device and said resistor being connected across said tank circuit; a condenser in series with an inductor, said condenser and said inductor being connected across said resistor and being tuned to a frequency slightly higher than said fundamental frequency; and means coupling said selective load to said inductor.

5. A harmonic generator comprising: a transistor having base, emitter and collector electrodes; a high Q resonant tank circuit tuned to a predetermined fundamental frequency and connected between said collector and a point of reference potential; a biasing network for energizing said tank circuit, said biasing network comprising first, second and third series connected resistors connected between said emitter electrode and said source of reference potential; a source of direct current potential connected across said second and third series connected resistors, one terminal of said source of potential being connected to said point of reference potential; a condenser connecting said base electrode to said point of reference potential for alternating currents, said condenser being connected across said third resistor for providing an alternating current bypass for said third resistor; a resonant feedback connection from a portion of said tank circuit to said emitter electrode; a frequency-selective load; a shunt circuit coupling said frequency-selective load to said tank circuit; said shunt circuit automatically regulating the Q of said tank circuit and selectively amplifying predetermined harmonics in accordance with said load, said shunt circuit including first, second, third and fourth branches; said first branch comprising a first unidirectional conduction device in series with a first resistor, said first branch being connected across said tank circuit; said second branch comprising a first condenser in series with a first inductor, said second branch being connected across said first resistor and being tuned to a frequency slightly higher than said fundamental frequency; and said third branch comprising a second unidirectional conduction device connected in series with a second resistor, said third branch being connected across said first inductor and said fourth branch, including said frequency-selective load connected across said second resistor.

References Cited in the file of this patent

UNITED STATES PATENTS

| | | |
|---|---|---|
| 1,885,728 | Keith | Nov. 1, 1932 |
| 2,704,330 | Marker | Mar. 15, 1955 |